United States Patent
Van Lith et al.

(10) Patent No.: US 6,676,553 B2
(45) Date of Patent: Jan. 13, 2004

(54) DRIVING BELT AND TRANSVERSE ELEMENT FOR A DRIVING BELT

(75) Inventors: Johannes Hendrikus Van Lith, Berlicum (NL); Jeroen Herman Van Liempd, Bavel (NL); Marco Van Schaik, Breda (NL)

(73) Assignee: Van Doorne's Transmissie B.V., Tilburg (NL)

( * ) Notice: Subject to any disclaimer, the term of this patent is extended or adjusted under 35 U.S.C. 154(b) by 0 days.

(21) Appl. No.: 09/883,372

(22) Filed: Jun. 19, 2001

(65) Prior Publication Data

US 2002/0032090 A1 Mar. 14, 2002

(30) Foreign Application Priority Data

Jun. 21, 2000 (NL) .............................. 1015491

(51) Int. Cl.[7] ................................. F16G 1/22
(52) U.S. Cl. ....................... 474/242; 474/201
(58) Field of Search ............... 474/201, 202, 474/238, 242, 265

(56) References Cited

U.S. PATENT DOCUMENTS 4,386,921 A * 6/1983 Roberts ...................... 474/201
4,610,648 A    9/1986 Miranti, Jr. ................. 474/242
5,123,879 A * 6/1992 Lecouturier et al. ........ 474/242
5,169,369 A * 12/1992 Masuda et al. ............. 474/242

FOREIGN PATENT DOCUMENTS

| EP | 0014013 |   | 8/1980  |           |
|----|---------|---|---------|-----------|
| EP | 0143293 |   | 6/1985  |           |
| EP | 0278545 |   | 8/1988  |           |
| GB | 421804  | * | 4/1991  | F16G/5/16 |
| JP | 62-106147 | * | 5/1987 | F16G/5/16 |
| JP | 1-247841 | * | 10/1989 | F16G/5/16 |

* cited by examiner

*Primary Examiner*—Thomas R. Hannon
*Assistant Examiner*—Vicky A. Johnson
(74) *Attorney, Agent, or Firm*—Young & Thompson

(57) ABSTRACT

A driving belt for use in a continuously variable transmission includes two V-shaped pulleys. The driving belt includes a carrier of two endless band packages lying side by side, on which transverse elements are disposed. Each transverse element includes two recesses positioned opposite each other for receiving the band packages, so that a part of the transverse element is positioned between the band packages. Each recess includes an inside surface facing towards the band package, wherein the portion of the inside surface that is formed by the aforesaid part of the transverse element includes an acute angle, near the underside of the band packages, with the plane in which the band packages lie.

18 Claims, 1 Drawing Sheet

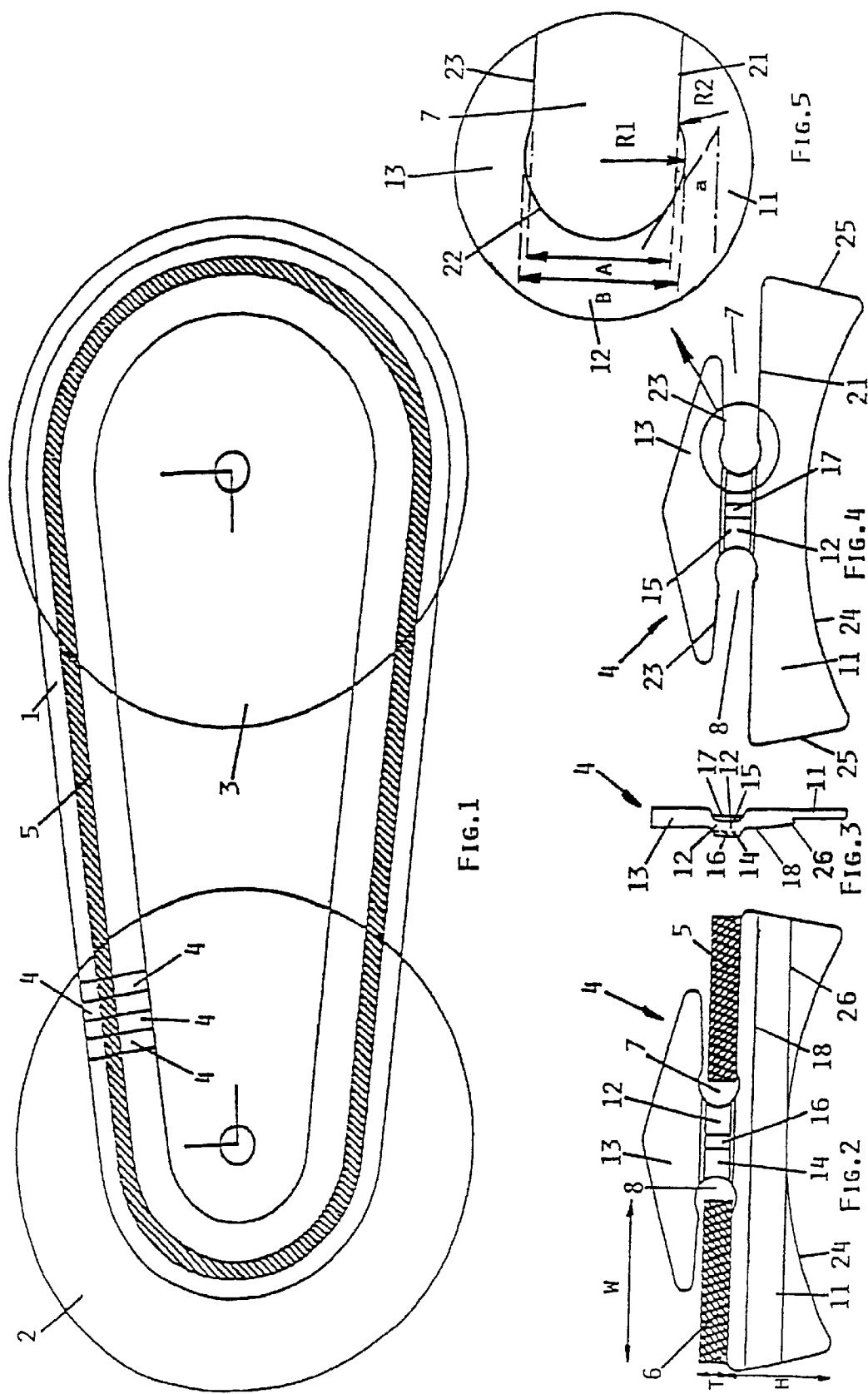

DRIVING BELT AND TRANSVERSE ELEMENT FOR A DRIVING BELT

BACKGROUND OF THE INVENTION

The invention relates to a driving belt for use in a continuously variable transmission comprising two V-shaped pulleys, which driving belt comprises a carrier consisting of two endless band packages lying side by side, on which transverse elements are disposed, wherein each transverse element includes two recesses positioned opposite each other for receiving the band packages, so that a first part of the transverse element extends under said band packages, a second part of the transverse element is positioned between said band packages and a third part of the transverse element extends above said band packages, wherein each recess includes an inside surface facing towards the band package. Such a driving belt is known from EP-A-0 014 013.

DESCRIPTION OF THE RELATED ART

In practice it has become apparent that the shape of the inside surface of the recess must meet specific requirements in order to effect a satisfactory operation of the driving belt. Said shape in particular has an influence on the correct operation of the band packages, which form vulnerable parts of the driving belt. They are subjected to a relatively large tensile strain, and also to a substantial, varying flexural strain, which depends on the transmission ratio that has been selected. Said band packages make contact with the aforesaid inside surface, whereby they can also make contact with the inside surface at the location of the aforesaid second part of the transverse element. It is especially for that reason that in practice said inside surface is always a flat surface, which extends in vertical longitudinal direction.

Each time a direction is described in relation to a transverse element, it is assumed that the transverse element occupies an upright position, as is shown in front elevation in FIG. 2. In said figure, the longitudinal direction is the direction perpendicularly to the plane of the figure.

It has become apparent upon testing the strength of the transverse element that the use of relatively small radii has a relatively large negative influence on the strength of the transverse element. The strength of the transverse element furthermore appears to be critical near the aforesaid second part of the transverse element.

SUMMARY OF THE INVENTION

The object of the invention is to improve with regard to the shape of the transverse element, which benefits the strength of said transverse element.

According to the invention, in order to accomplish that objective, the portion of the inside surface that is formed by said second part of the transverse element includes an acute angle (a), near the underside of the band packages, with the plane in which the band packages lie.

In particular when measures are taken to retain the band packages correctly in position during operation of the driving belt, any contact that may take place especially between in particular the lowermost band of a band package and the inside surface at the location of the second part of the transverse element appears to involve little force, so that the risk of damage is small. The band packages can be retained in position, in particular during operation, in that the inside surface is designed to be slightly convex at the location of said first part of the transverse element.

By designing the flat part of the inside surface with a smaller surface area at the location of the second part of the transverse element, which is the object of the aforesaid measure, or even forming the relevant part of the inside surface with a curvature in its entirety, larger radii can be used for the rounding of the inside surface near the second part of the transverse element.

Preferably, said angle (a) is less than 85°, more preferably less than 75° and even more preferably less than 60°. Also an angle (a) of less than 45° can be used advantageously.

In one preferred embodiment, the portion of the inside surface that is formed by the second part of the transverse element includes a substantially flat part, whose length (height) is smaller than the thickness of a band package. Furthermore, the portion of the inside surface that is formed by said second part of the transverse element may exhibit a concave curvature over its entire area.

Preferably, the radius of curvature of the concave portion of the inside surface at the transition between said first and said second part of the transverse element is more than one third, preferably more than half, of the smallest distance between the portion of the inside surface that is formed by the first part of the transverse element and the portion of the inside surface that is formed by the third part of the transverse element.

In one preferred embodiment the radius (R1) of the concave curvature of the inside surface at the transition between said first part and said second part of the transverse element is more than 0.7 mm, preferably more than 0.9 mm.

In one preferred embodiment the portion of the inside surface that is formed by the first part of the transverse element exhibits a convex curvature having a radius (R2) of more than 0.6 mm, preferably more than 1.5 mm, more preferably more than 2 mm, near the transition to the portion of the inside surface that is formed by the second part of the transverse element. A larger radius has a positive effect on the life of the band packages.

Preferably, the smallest vertical distance (A) of the recess amounts to more than 75% of the largest vertical distance (B) of the recess near the second part of the transverse element, more preferably more than 85%.

In one preferred embodiment the width of a band package is more than 80%, preferably more than 90%, of the largest distance between the surface of the transverse element that can come into contact with the pulley and the second part of the transverse element.

Preferably, the transverse element is made from a strip of material by means of a cutting operation, and the edges of the transverse element have been deburred and/or been rounded by means of a tumbling operation.

The invention furthermore relates to a transverse element for use in a driving belt for a continuously variable transmission comprising two V-shaped pulleys, which transverse element includes two recesses positioned opposite each other for receiving band packages forming a carrier, so that a first part of the transverse element extends under said band packages, a second part of the transverse element is positioned between said band packages and a third part of the transverse element extends above said band packages, wherein each recess includes an inside surface facing towards the band package, wherein the portion of the inside surface that is formed by said second part of the transverse element includes an acute angle (a), near the underside of the band packages, with the plane in which the band packages lie.

BRIEF DESCRIPTION OF THE DRAWINGS

In order to explain the invention more fully, an exemplary embodiment of a driving belt will be described hereafter with reference to the drawing.

FIG. 1 is a schematic side view of a driving belt;

FIG. 2 is a front view of a transverse element;

FIG. 3 is a side view of the transverse element;

FIG. 4 is a rear view of the transverse element;

FIG. 5 is a view of a detail of FIG. 4.

The schematic illustration of FIG. 1 shows the driving belt 1, which runs over two pulleys 2, 3. In the illustrated situation, the left-hand pulley 2 rotates faster than the right-hand pulley 3. By changing the mutual distance between the two parts of which each pulley 2, 3 consists, it is possible to change the radius of the driving belt 1 at the location of pulley 2, 3, as a result of which the difference in speed between the two pulleys 2, 3 can be varied as desired. This is a well-known way of varying a difference in rotational speed between two shafts.

The driving belt 1, which is shown in side elevation in FIG. 1, is built up of a plurality of transverse elements 4 (four of which are shown in FIG. 1) and two band packages 5, 6, one of which is indicated by the shaded part in the figure. Both the transverse elements 4 and the bands of the band packages 5, 6 are made of a metal. The transverse elements 4 can move freely in the longitudinal direction of the band packages 5, 6, so that when a force is being transmitted between pulleys 2, 3, said force is transmitted by the transverse elements 4 pressing one against another. The band packages guide the transverse elements 4 thereby.

In the illustrated embodiment, each band package 5, 6 consists of five bands, as is shown in FIG. 2. In practice, a band package 5, 6 frequently comprises more bands, for example ten. In FIG. 2, the thickness of the band package 6 is indicated at T and the width is indicated at W. The thickness of a band is 0.2 mm, for example, with the width being 7 mm.

It will be apparent that the band packages 5, 6 cannot move out laterally, because parts of the pulleys 2, 3 are positioned on either side of the driving belt 1. From the figures it is apparent that the shape of transverse elements 4 has been selected so that said transverse elements are retained in position by the band packages 5, 6. Said shape comprises two recesses 7, 8, in which the band packages 5, 6 are accommodated.

Transverse element 4 consists of a first part 11, which extends under band packages 5, 6, a second part 12, which is located between band packages 5, 6, and a third part 13, which extends above band packages 5, 6.

The rear side of transverse element 4 (shown in FIG. 4) is substantially flat, and on its front side (shown in FIG. 2), transverse element 4 exhibits a so-called tilting line 18. The part of transverse element 4 above tilting line 18 has a substantially constant thickness, seen in side elevation (FIG. 3), whilst the first part 11 under tilting line 18 tapers off in downward direction. Tilting line 18 is in fact formed by a slightly rounded strip on the front side of transverse element 4, for example by an edge having a radius of curvature of 6 mm. Tilting line 18 is in contact with the rear side of the adjacent transverse element 4, both in the straight parts of driving belt 1 and in the curved parts thereof.

Below tilting line 18, first part 11 tapers off to an edge 26 extending in horizontal direction. First part 11 below edge 26 exhibits a constant thickness, which is about 0.1 mm less than the thickness of transverse element 4 just above edge 26.

As can be seen in particular in FIG. 3, the second part 12 of transverse element 4 is shifted to the left (in FIG. 3), as a result of which a projection 14 is formed on the front side of transverse element 4, whilst a recess 15 is present on the rear side. As is apparent from FIGS. 2 and 4, projection 14 and recess 15 extend in horizontal direction over the entire second part 12 of transverse element 4.

Projection 14 and recess 15 interlock in the straight parts of driving belt 1, as a result of which two abutting transverse elements 4 are prevented from shifting relative to each other.

As FIG. 2 shows, projection 14 is centrally provided with a recessed part 16, and FIG. 4 shows that recess 15 is centrally provided with a projecting part 17. In this manner, the surfaces of projection 14 and recess 15 include parts which extend at an angle to a horizontal line in the plane in which band packages 5, 6 lie, and which extends perpendicularly to the direction of driving belt 1.

In a straight part of the driving belt 1, the projecting part 17 comes into engagement with the recessed part 16, so that relative movement of two transverse elements 4 lying adjacently to each other is reduced or prevented altogether as a result of said parts including an angle coming into contact with each other.

As appears from the figures, projection 14 and recess 15 are located entirely in the second part 12 of transverse element 4, as a result of which their dimension in transverse direction (horizontal direction) is limited.

Each of the recesses 7, 8 is bounded by an inside surface that is formed by portions of first part 11, second part 12 and third part 13 of transverse element 4. Said portions are indicated by numerals 21, 22 and 23, respectively, in FIG. 5.

FIG. 5 is a detailed view of the shape of recess 7. Inside portion 21 includes a straight or slightly curved part at the location of first part 11 of transverse element 4, which part comes into contact with the band package 5. Said part merges with a convex portion thereof having a radius R2 into a concave portion of the inside surface having a radius R1 at the location where portion 21 of the inside surface merges with portion 22.

In the illustrated embodiment, R1 equals approximately half the distance B, which distance is the largest vertical dimension of recess 7 near the second part 12 of transverse element 4. The inside surface 22 at the location of second part 12 may exhibit a vertical, straight portion at the location of second part 12 (FIG. 6), but in the present embodiment said portion 22 of the inside surface is curved in its entirety, and that practically in the form of an arc having a radius R1 (FIGS. 4–5).

In FIG. 5, letter A indicates the smallest vertical dimension of recess 7, which dimension is preferably larger than 80% of the largest vertical dimension B of recess 7 near the second part 12 of transverse element 4.

FIG. 5 shows angle a, which is the angle which the portion 22 of the inside surface that is formed by the second part 12 of transverse element 4 includes near the underside of band packages 5, 6 with the plane in which band packages 5, 6 lie. As is shown in FIG. 5, said angle is an acute angle, preferably of less than 85°.

In practice it has become apparent that the convex curvature having radius R2 must be sufficiently large, for example 0.4 mm or more. When the radius R2 is not large enough, damage to the innermost band of the band package 5, 6 may ensue. Also the radius R1 of the adjoining concave curvature must be sufficiently large. It has become apparent that when R1 is larger than 0.7 mm, the risk of fracture of the transverse element 4 is reduced to such an extent that the first part 11 of 64 may be smaller, that is, have less mass. It is possible thereby to reduce the distance between the lower edge 24 of transverse element 4 and the inside surface 21, 22 at the location of the aforesaid curvature significantly, that is, said distance can be much smaller than the height H of the surface 25 of transverse element 4 that comes into contact with pulleys 2, 3. Said reduction contributes to a satisfactory dynamic behaviour of the transverse element. Preferably, the lower edge 24 is concave over substantially its entire length.

The above-described embodiment is merely an exemplary embodiment; many other embodiments are possible.

What is claimed is:

1. A driving belt for use in a continuously variable transmission comprising two V-shaped pulleys (2, 3), which driving belt (1) comprises:
   a carrier consisting of two endless band packages (5, 6) lying side by side, on which transverse elements (4) are disposed,
   wherein each transverse element (4) includes two recesses (7, 8) positioned opposite each other for receiving the band packages (5, 6), so that a first part (11) of the transverse element (4) extends under said band packages (5, 6), a second part (12) of the transverse element (4) is positioned between said band packages (5, 6), and a third part (13) of the transverse element (4) extends above said band packages (5, 6), wherein each recess includes an inside surface (21, 22, 23) facing towards the band package (5,6),
   a first portion (22) of the inside surface that is formed by said second part (12) of the transverse element (4) includes an acute angle (a), near the underside of the band packages (5, 6), with the plane in which the band packages (5, 6) lie, and
   the first portion (22) merges, through a convex portion, with a second portion (21) of the inside surface that is formed by said first part (11),
   the acute angle (a) being located apart from the convex portion and being defined by an intersection of a first horizontal line drawn contacting an uppermost surface of the second portion and a second line drawn tangential to the first portion at the point the first line intersects the first portion.

2. A driving belt according to claim 1, characterised in that said angle (a) is less than 85°.

3. A driving belt according to claim 1, characterised in that the first portion (22) of the inside surface that is formed by said second part (12) of the transverse element (4) exhibits a concave curvature over its entire area.

4. A driving belt according to claim 1, characterised in that the radius (R1) of the concave curvature of the inside surface (21, 22) at the transition between said first part (11) and said second part (12) of the transverse element (4) is more than 0.7 mm.

5. A driving belt according to claim 4, characterised in that a convex curvature, a said convex portion has a radius (R2) of more than 0.6 mm.

6. A driving belt according to claim 1, characterised in that the smallest vertical distance (A) of the recess amounts to more than 75% of the largest vertical distance (B) of the recess near the second part (12) of the transverse element (4).

7. A driving belt according to claim 1, characterised in that the width (W) of a band package (5, 6) is more than 80% of the largest distance between an end surface (25) of the transverse element (4) that can come into contact with the pulley (2, 3) and the second part (12) of the transverse element (4).

8. A driving belt according to claim 1, characterised in that the transverse element (4) has been made from a strip of material by means of a cutting operation or by means of a material-deforming operation.

9. A driving belt according to claim 1, characterised in that edges of the transverse element (4) have been deburred or rounded.

10. A driving belt according to claim 1, characterised in that said angle (a) is less than 75°.

11. A driving belt according to claim 1, characterised in that said angle (a) is less than 65°.

12. A driving belt according to claim 1, characterised in that the radius (R1) of the concave curvature of the inside surface (21, 22) at the transition between said first part (11) and said second part (12) of the transverse element (4) is more than 0.9 mm.

13. A driving belt according to claim 1, characterised in that the smallest vertical distance (A) of the recess amounts to more than 85% of the largest vertical distance (B) of the recess near the second part (12) of the transverse element (4).

14. A driving belt according to claim 1, characterised in that the width (W) of a band package (5, 6) is more than 90% of the largest distance between an end surface (25) of the transverse element (4) that can come into contact with the pulley (2, 3) and the second part (12) of the transverse element (4).

15. A driving belt for use in a continuously variable transmission comprising two V-shaped pulleys (2,3), which driving belt (1) comprises:
    a carrier consisting of two endless band packages (5, 6) lying side by side, on which transverse elements (4) are disposed,
    wherein each transverse element (4) includes two recesses (7, 8) positioned opposite each other for receiving the band packages (5, 6), so that a first part (11) of the transverse element (4) extends under said band packages (5, 6), a second part (12) of the transverse element (4) is positioned between said band packages (5, 6), and a third part (13) of the transverse element (4) extends above said band packages (5, 6), wherein each recess includes an inside surface (21, 22, 23) facing towards the band package (5,6),
    a first portion (22) of the inside surface that is formed by said second part (12) of the transverse element (4) includes an acute angle (a), near the underside of the band packages (5, 6), with the plane in which the band packages (5, 6) lie, and
    the first portion (22) merges, through a convex portion, with a second portion (21) of the inside surface that is formed by said first part (11),
    characterised in that the radius of curvature (R1) of the concave portion of the inside surface (21, 22) at the transition between said first part (11) and said second part (12) of the transverse element (4) is more than one third of the smallest distance (A) between the portion (21) of the inside surface that is formed by the first part (11) of the transverse element (4) and a third portion (23) of the inside surface that is formed by the third part (13) of the transverse element (4).

16. A driving belt for use in a continuously variable transmission comprising two V-shaped pulleys (2,3), which driving belt (1) comprises:
    a carrier consisting of two endless band packages (5, 6) lying side by side, on which transverse elements (4) are disposed,
    wherein each transverse element (4) includes two recesses (7, 8) positioned opposite each other for receiving the band packages (5, 6), so that a first part (11) of the transverse element (4) extends under said band packages (5, 6), a second part (12) of the transverse element (4) is positioned between said band packages (5, 6), and a third part (13) of the transverse element (4) extends above said band packages (5, 6), wherein each recess includes an inside surface (21, 22, 23) facing towards the band package (5,6), a first portion (22) of the inside surface that is formed by said second part (12) of the transverse element (4) includes an acute angle (a), near the underside of the band packages (5, 6), with the plane in which the band packages (5, 6) lie, and the first portion (22) merges, through a convex portion, with a second portion (21) of the inside surface that is formed by said first part (11), characterised in that the radius of curvature (R1) of the concave portion of the inside surface (21, 22) at the transition between said first part (11) and said second part (12) of the transverse element (4) is more than one half of the smallest distance (A) between the portion (21) of the inside surface that is formed by the first part (11) of the transverse element (4) and a third portion (23) of the inside surface that is formed by the third part (13) of the transverse element (4).

17. A driving belt (1) for use between two V-shaped pulleys (2, 3) in a continuously variable transmission, comprising:

two endless band packages (5,6) lying side by side; and transverse elements (4) disposed on said two endless band packages, each transverse element comprising two recesses (7, 8) positioned opposite each other for receiving said band packages (5, 6), a first part (11) extending under said band packages (5, 6), a second part (12) positioned between said band packages (5, 6), and a third part (13) extending above said band packages (5, 6), the second part (12), in a side view, being shifted left with respect to the first and third parts, so that the second part forms a projection (14) on a front side of the transverse element and a recess (15) on a rear side of the transverse element, respective adjacent first and second transverse elements being arranged so that the projection from the first transverse element engages with the recess from the second transverse element to interlock the first and second transverse elements and prevent the first and second transverse elements from shifting relative to each other, each recess (7, 8) including an inside surface (21, 22, 23) facing towards the band package (5, 6), a first portion (22) of the inside surface that is formed by said second part (12) of the transverse element (4) including an acute angle (a), near the underside of the band packages (5, 6), with the plane in which the band packages (5, 6) lie, the first portion (22) merging, through a convex portion, with a second portion (21) of the inside surface that is formed by said first part (11), the acute angle (a) being located apart from the convex portion and being defined by an intersection of a first horizontal line drawn contacting an uppermost surface of the second portion and a second line drawn tangential to the first portion at the point the first line intersects the first portion.

18. A driving belt (1) for use between two V-shaped pulleys (2, 3) in a continuously variable transmission, comprising:

two endless band packages (5,6) lying side by side; and transverse elements (4) disposed on said two endless band packages, each transverse element comprising two recesses (7, 8) positioned opposite each other for receiving said band packages (5, 6), a first part (11) extending under said band packages (5, 6), a second part (12) positioned between said band packages (5, 6), a third part (13) extending above said band packages (5, 6), the second part (12), in a side view, being shifted left with respect to the first and third parts, so that the second part forms a projection (14) on a front side of the transverse element and a recess (15) on a rear side of the transverse element, respective adjacent first and second transverse elements being arranged so that the projection from the first transverse element engages with the recess from the second transverse element to interlock the first and second transverse elements and prevent the first and second transverse elements from shifting relative to each other, each recess (7, 8) including an inside surface (21, 22, 23) facing towards the band package (5, 6), a first portion (22) of the inside surface that is formed by said second part (12) of the transverse element (4) including an acute angle (a), near the underside of the band packages (5, 6), with the plane in which the band packages (5, 6) lie, the first portion (22) merging, through a convex portion, with a second portion (21) of the inside surface that is formed by said first part (11), a recessed part (16) centrally located on the projection (14); and a projecting part (17) centrally located on the recess (15), wherein, in a straight part of the driving belt, the projecting part of the second transverse element engages with the recessed part of the first transverse element.

* * * * *